(12) United States Patent
Lortie

(10) Patent No.: US 8,525,877 B2
(45) Date of Patent: *Sep. 3, 2013

(54) APPARATUS AND METHOD FOR CONDUCTING REMOTE VIDEO INSPECTION FROM ABOVE

(75) Inventor: Alain Lortie, Terrebonne (CA)

(73) Assignee: Infratech Sewer & Water Services, Sudbury, ON (CA)

( * ) Notice: Subject to any disclaimer, the term of this patent is extended or adjusted under 35 U.S.C. 154(b) by 1898 days.

This patent is subject to a terminal disclaimer.

(21) Appl. No.: 11/280,201

(22) Filed: Nov. 17, 2005

(65) Prior Publication Data

US 2007/0109403 A1  May 17, 2007

(51) Int. Cl.
*H04N 7/18* (2006.01)

(52) U.S. Cl.
USPC .................................. 348/85; 348/82; 348/84

(58) Field of Classification Search
USPC ............ 348/85, 82, 84; 73/865.8; 134/22.12
See application file for complete search history.

(56) References Cited

U.S. PATENT DOCUMENTS

| | | | |
|---|---|---|---|
| 3,730,632 | A | 5/1973 | Chikama |
| 4,115,804 | A | 9/1978 | Morton et al. |
| 4,158,490 | A | 6/1979 | Gottschalk et al. |
| 4,651,558 | A | 3/1987 | Martin et al. |
| 4,938,060 | A | 7/1990 | Sizer et al. |
| 4,974,168 | A | 11/1990 | Marx |
| 5,065,249 | A | 11/1991 | Horn et al. |
| 5,195,392 | A | 3/1993 | Moore et al. |
| 5,757,419 | A | 5/1998 | Qureshi et al. |
| 5,956,077 | A | 9/1999 | Qureshi et al. |
| 6,091,453 | A * | 7/2000 | Coan et al. .................... 348/373 |
| 6,111,600 | A * | 8/2000 | McLeod et al. ................ 348/84 |
| 6,293,676 | B1 | 9/2001 | Holway |
| 6,505,525 | B2 | 1/2003 | McGrew |
| 6,538,732 | B1 | 3/2003 | Drost et al. |
| 6,792,820 | B2 * | 9/2004 | Wentworth et al. .......... 73/865.8 |
| 6,923,542 | B2 | 8/2005 | Harris |
| 2002/0162406 | A1 * | 11/2002 | Wentworth et al. .......... 73/865.8 |
| 2003/0142207 | A1 * | 7/2003 | Olsson et al. .................. 348/84 |

(Continued)

FOREIGN PATENT DOCUMENTS

| | | |
|---|---|---|
| EP | 0108587 | 5/1984 |
| EP | 1051037 | 11/2000 |

(Continued)

OTHER PUBLICATIONS

International Search Report of International Patent Application No. PCT/CA2006/001871; Mar. 1, 2007.

(Continued)

*Primary Examiner* — Le H Luu
(74) *Attorney, Agent, or Firm* — Benoît & Côté

(57) ABSTRACT

An apparatus for conducting remote subsurface inspections from above is disclosed. The apparatus comprises a support structure, a telescoping mast held by a coupling and born by the support structure, an imaging system held by an extendable portion of the telescoping mast and an offsetting mechanism. The apparatus may further comprise an articulating radial arm with pivots for locating the telescoping mast. The support structure of the apparatus may also include an adaptor section for fitting to a receiver of a hitch of a vehicle. A method for conducting remote subsurface inspections from above is also disclosed. The method of inspection comprises the steps of locating an access point on a working surface, positioning an apparatus for conducting remote subsurface inspections from above, manipulating the telescoping mast above the access point, lowering it and reviewing images from the imaging system.

23 Claims, 8 Drawing Sheets

(56) References Cited

U.S. PATENT DOCUMENTS

| | | | |
|---|---|---|---|
| 2004/0083829 A1* | 5/2004 | Chapman et al. | 73/865.8 |
| 2004/0160514 A1* | 8/2004 | Tawfig et al. | 348/85 |
| 2004/0160600 A1 | 8/2004 | Drost et al. | |
| 2005/0000546 A1* | 1/2005 | Davis | 134/22.12 |
| 2005/0056105 A1* | 3/2005 | Delacroix et al. | 73/865.8 |
| 2005/0157842 A1 | 7/2005 | Agrawal et al. | |
| 2005/0185089 A1 | 8/2005 | Chapman | |

FOREIGN PATENT DOCUMENTS

| | | |
|---|---|---|
| EP | 1051037 Y | 11/2000 |
| EP | 1288694 A | 3/2003 |
| GB | 1240837 A | 7/1971 |
| WO | WO 97/08633 Y | 3/1997 |
| WO | WO2005/016692 | 2/2005 |
| WO | WO 2005/016692 A | 2/2005 |
| WO | WO 2005/024507 A | 3/2005 |
| WO | WO 2005/026919 A | 3/2005 |

OTHER PUBLICATIONS

International Search Report of International Patent Application No. PCT/CA2006/001871. Mar. 1, 2007.

* cited by examiner

40: ARTICULATING RADIAL ARM
44: SECOND PIVOT
44a: SECOND ROTATION AXIS
45a: FIRST ARM SECTION
45b: SECOND ARM SECTION
45c: THIRD ARM SECTION
48: FOURTH PIVOT

34: STABILIZING MECHANISM
42: FIRST PIVOT
44: SECOND PIVOT
46: THIRD PIVOT

APPARATUS AND METHOD FOR CONDUCTING REMOTE VIDEO INSPECTION FROM ABOVE

FIELD OF THE INVENTION

The present invention generally relates to the remote inspection of areas that are difficult to reach. More specifically, the invention relates to inspection of underground sewers, railroad bridge support structures and other facilities that may be examined remotely from a location above, using a video camera or other imaging system.

BACKGROUND OF THE INVENTION

It is sometimes necessary to inspect certain areas that are inconvenient and/or time-consuming to access. For illustrative purposes, the inspection of storm and sewer pipes will be described, although the scope of the present invention is by no means limited to this application. Most municipalities contain a vast network of storm and sewer pipes. Periodically, these pipes must be inspected for problems such as cracks, blockage, build-up, and root infiltration. If a problem is detected, detailed images must be obtained to facilitate planning to remedy the situation. To this end, it is common for an invasive device such as a pipe crawler or push camera to be introduced into the pipe to perform the inspection and, at the same time, to obtain details of any problem encountered.

Although effective in obtaining detailed images, using a pipe crawler is inconvenient and requires a great deal of time to set up and operate, even if no problems are discovered. Setting up a pipe crawler involves first interrupting the water flow ahead of the pipes to be inspected and diverting it with a pump system, then cleaning all the pipes and finally introducing the pipe crawler in the pipe, which in itself requires the entering of a man through a manhole. In other words, much work is needed to obtain detailed information regardless of whether a problem exists.

Other methods for routine inspection involve using a camera with a powerful zoom fitted to the lower end of a mast. The camera and mast are lowered into a manhole until the camera reaches one of the sewer pipes. There, the camera is made to zoom in and out to obtain images of the interior of the pipe. Suspending the camera and mast by hand requires much manipulation and becomes rapidly tiring. Mounting the camera and mast to a vehicle is far more convenient. The operator can drive up to the area to be inspected, position his vehicle over a manhole, lower the camera into the manhole until it reaches the pipe to be inspected, and start collecting data.

Known vehicle mounted inspection cameras have a major drawback however. Since the camera and mast are lowered vertically from the vehicle, they are not capable of adequately reaching lateral sewer pipes that are offset from the manhole. Although most manholes are positioned squarely above the lateral conduits that they access, some manholes are substantially offset, generally because of an obstacle being in the way. In many municipalities, approximately 10% of the underground piping network does not receive proper routine inspection with known equipment because the pipes are offset from the manholes that access them.

Therefore, there is a need for a routine inspection system that is both convenient for the operator, cost effective, and that allows reaching substantially all conduits radiating from a manhole, including those that are offset.

SUMMARY OF THE INVENTION

In accordance with a first broad aspect of the present invention, there is provided an apparatus for conducting remote subsurface inspection from above. The apparatus comprises a support structure, a mast, an imaging system and an offsetting mechanism. The support structure has an articulating radial arm and is adapted to be positioned above a working surface. The articulated radial arm has a pivot at one end and a coupling at the other end. The pivot has a rotation axis substantially normal to the working surface. Preferably, the support structure further comprises a retractable ground contacting leg to aid in stabilizing the mast when the apparatus is in use. The mast is held by the coupling and is born generally upright in use by the support structure. The mast has a portion that is downwardly extendable below the working surface and has a mounting on that extending portion to hold an imaging system. An actuating mechanism is preferably used to extend and retract the extending portion of the mast. More preferably, the mast comprises telescoping cylindrical sections. Advantageously, the imaging system comprises a video camera having a zoom lens of at least 20 times magnification. The imaging system preferably further comprises at least one light. More preferably, a plurality of lights is arranged around the video camera. The offsetting mechanism is operative to displace the imaging system laterally from a vertical reference axis beneath the coupling when the extending portion of the mast has been extended below the working surface.

The coupling preferably comprises a mast pivot having a mast rotation axis substantially perpendicular to the extension axis of the mast. The mast is maneuverable to allow its rotation with respect to the support structure around the mast rotation axis.

Optionally, the mounting comprises an adjustable interconnection between the imaging system and the extending portion of the mast. The interconnection is remotely maneuverable from a first position in which the imaging system is proximal to the extending portion of the mast, to a second position in which the imaging system is displaced from the extending portion of the mast.

Preferably, the articulating radial arm comprises a plurality of sections joined by swivels. More preferably, the swivels and the mast pivot have locking mechanism to prevent their free rotation. Even more preferably, the support structure comprises an adaptor section adapted to fit to a hitch installed on a vehicle.

A display may optionally be provided to display images from the imaging system. Preferably, the display is mounted on a portion of the mast that is not downwardly extendable below the working surface.

In accordance with a second broad aspect of the present invention, there is provided a method for conducting remote subsurface inspections from above. The method comprises the steps of (a) locating an access point on a working surface above a subsurface area, (b) positioning an apparatus for conducting remote subsurface inspections from above as here above disclosed proximal to the access point, (c) manipulating the mast of the apparatus in vertical alignment with the access point, (d) lowering the extending portion of the mast downwardly into such subsurface area until the imaging system of the apparatus is at the level to be inspected and (e) reviewing images of such subsurface area from the imaging system. Preferably, in step (d), the mast is lowered vertically, or substantially vertically, in the subsurface area.

Preferably, the method further comprises the step of displacing the imaging system laterally from a vertical reference axis beneath the coupling of the support structure of the apparatus when the extending portion of the mast has been extended below the working surface. More preferably, the coupling comprises a mast pivot, and the step of displacing the imaging system laterally comprises maneuvering the mast pivot to rotate the mast with respect to the support structure.

Optionally, the mounting of the extending portion of the mast comprises an adjustable interconnection between the imaging system and the extending portion of the mast. The step of displacing the imaging system laterally comprises remotely maneuvering the adjustable interconnection from a first position in which the imaging system is proximal to the extending portion of the mast, to a second position in which the imaging system is displaced from the extending portion of the mast.

In accordance with a third broad aspect of the invention, there is provided an apparatus for conducting remote subsurface inspections from above which comprises a support structure, a mast and an imaging system. The support structure has an articulated radial arm and a coupling and is adapted to be positioned above a working surface. The articulated radial arm is connected to the coupling. The mast is held by the coupling and is born generally upright in use by the support structure. Preferably, the mast comprises telescoping cylindrical sections. The mast has an extending portion that is downwardly extendable below the working surface. The extending portion has a mounting thereon. The imaging system is held by the mounting on the extending portion of the mast. Preferably, the imaging system comprises a video camera.

The apparatus preferably comprises an offsetting mechanism that is operative to displace the imaging system laterally from a vertical reference axis beneath the coupling when the extending portion of the mast has been extended below the working surface. More preferably, the coupling comprises a mast pivot having a mast rotation axis that is substantially perpendicular to the extension axis of the mast. The mast pivot is maneuverable to allow rotation of the mast with respect to the support structure around the mast rotation axis.

Optionally, the mounting comprises an adjustable interconnection between the imaging system and the extending portion of the mast. The interconnection is remotely maneuverable from a first position in which the imaging system is proximal to the extending portion of the mast, to a second position in which the imaging system is displaced from the extending portion of the mast.

Preferably, the articulating radial arm comprises a plurality of sections joined by swivels. More preferably, the support structure further comprises a retractable ground contacting leg to aid in stabilizing the mast when the apparatus is in use. Even more preferably, the support structure comprises an adaptor section adapted to fit to a hitch installed on a vehicle.

BRIEF DESCRIPTION OF DRAWINGS

These and other features of the present invention will become more apparent from the following description in which reference is made to the appended drawings wherein.

DETAILED DESCRIPTION OF THE INVENTION

Figure 1:
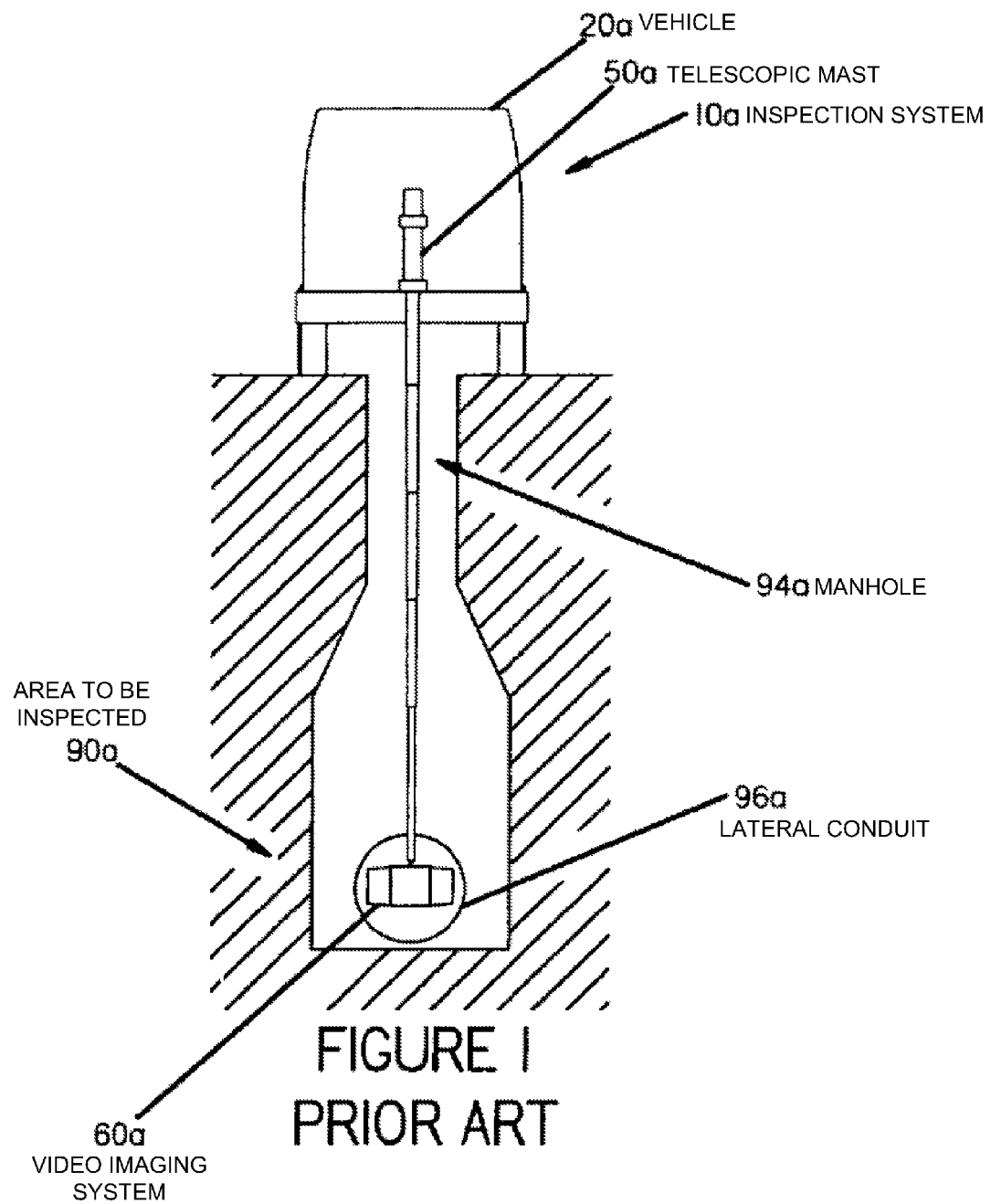
FIG. 1 shows a cross-sectional side view of prior art inspection assembly reaching an underground conduit.

FIG. 1 depicts an example of prior art. In this example, an inspection system 10a is mounted to a vehicle 20a having a telescoping mast 50a deployed through a manhole 94a such that a video imaging system 60a is able to reach the lateral conduit 96a.

Figure 2:
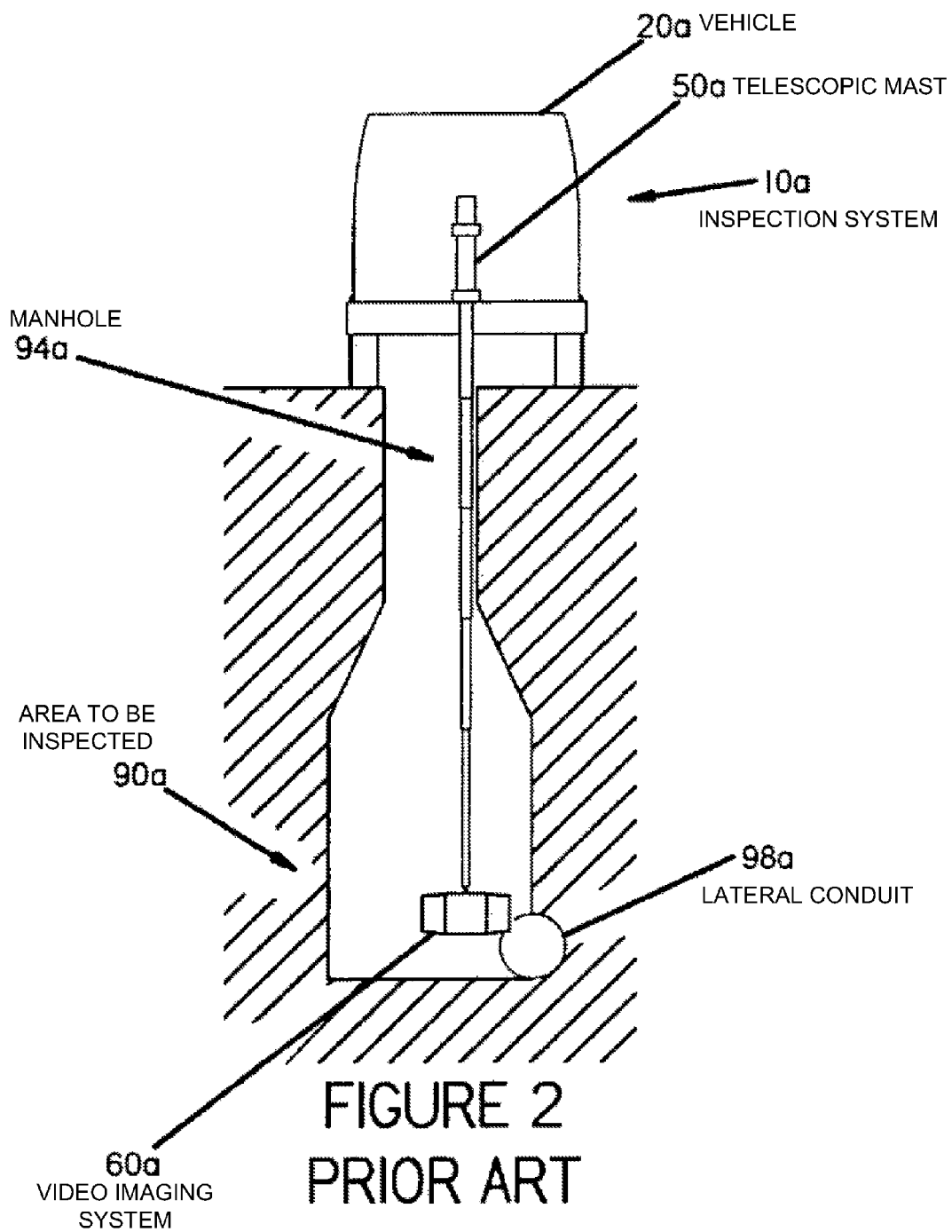
FIG. 2 shows a cross-sectional side view of prior art inspection assembly trying to reach an offset underground conduit.

FIG. 2 depicts the same example of prior art inspection system as in FIG. 1 trying to reach an offset lateral conduit 98a this time. It is apparent that even by positioning the vehicle 20a as close as possible to the side of the manhole 94a, it is not possible for the imaging system 60a to reach the center of the offset lateral conduit 98a.

Figure 3:
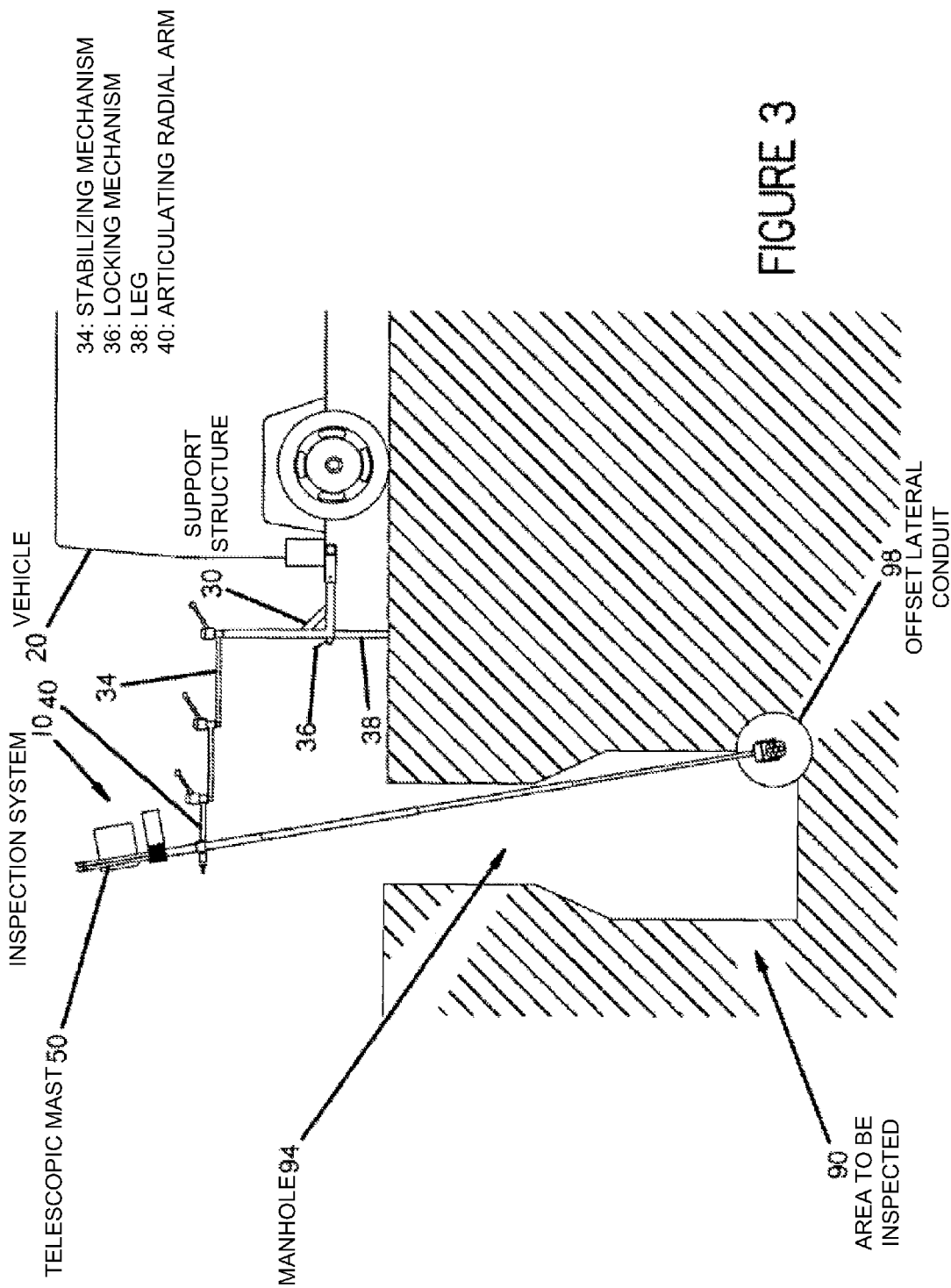
FIG. 3 shows a cross sectional front view of an embodiment of the present invention reaching an offset underground conduit.

FIG. 3 shows an embodiment of the present invention reaching a similarly offset lateral conduit 98 as the offset lateral conduit 98a depicted in the prior art system of FIG. 2. It is possible to see that by using the features of the present invention, it is now possible for the video imaging system 60 to reach an offset lateral conduit 98, even when not locating vehicle 20 precisely over the area to be inspected 90.

Figure 4:
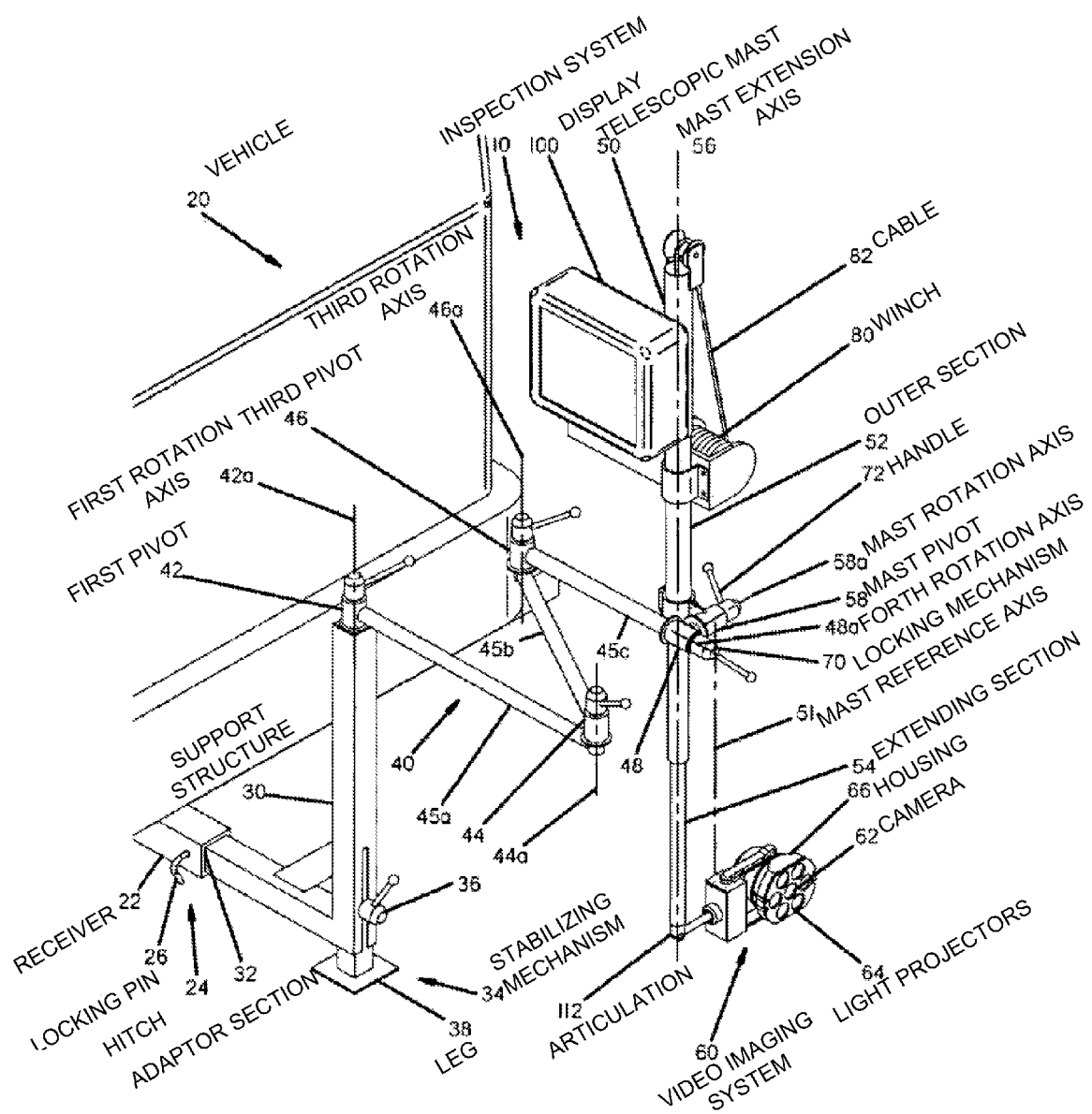
FIG. 4 shows a perspective view of an embodiment of the present invention.

As best seen in FIG. 4, the inspection system 10 is installed on a vehicle 20. In the present case, the adaptor section 32 of support structure 30 is inserted in the receiver 22 of the hitch 24. A locking pin 26 is used to hold the inspection system solidly connected to the hitch. Furthermore, a device using a set-screw (not shown) to press the support structure 30 against the receiver 22 may be used to remove any play in the assembly. To provide stability to the inspection system 10 such that the images sent by the video imaging system 60 are of good quality, a stabilizing mechanism 34 is used. When not in use, a leg 38 of the stabilizing mechanism 34 is retracted within the support structure 30. When in use, the leg 38 is lowered until it contacts the ground. Whether in the up or the down position, the leg 38 needs to be locked in place using the locking mechanism 36. In this embodiment of the invention, the inspection system 10 is depicted having an articulating radial arm 40 and a first, second and third pivots 42, 44, 46 having their respective first, second and third rotation axis 42a, 44a and 46a.

In the embodiment of the present invention shown in FIG. 4, the articulating radial arm 40 is interrupted at two places by a second pivot 44 and third pivot 46, defining three arm sections 45a, 45b, 45c. When the inspection system 10 is installed at the back of a road vehicle 20, the articulating radial arm 40, when folded, does not extend beyond the sides of the vehicle 20.

The telescoping mast 50 comprises multiple sections: a fixed outer section 52 and internally nested extending sections 54. The outer section 52 is connected to the articulating radial arm 40. The purpose of the telescoping mast 50 is to lower the video imaging system 60 into the manhole 94 closely to the centerline of lateral conduit. Typically, the telescoping mast 50 will be capable of reaching at least 20 feet underground. Sometimes, however, the lateral conduit is so offset from the manhole 94 that it is not possible for the video imaging system 60 to reach an offset lateral conduit 98 sufficiently well for it to be within field of view of the imaging system 60. Hence, the present invention uses an offsetting mechanism to offset the video imaging system 60 and thereby reach such an offset lateral conduits 98. FIG. 4 shows an embodiment of such an offsetting mechanism in the form of a mast pivot 58, connecting the outer section 52 to the articulating radial arm 40. Once the extending section 54 of the telescoping mast 50 has been extended underground, the mast pivot 58 allows the operator to tilt the telescoping mast 50 such that the video imaging system 60 is displaced from its original position, where it was more or less in line with a vertical reference axis 51 located beneath the mast pivot 58, to align with the offset lateral conduit 98. Hence, the video imaging system 60 has the inside of the offset lateral conduit 98 in its field of view and is capable of zooming in and out permitting the inspection to proceed. Once in position, the operator uses the locking mechanisms 70 to lock the telescoping mast 50 at the desired angle.

A winch 80, of which cable 82 is connected to the last extending section of the telescoping mast 50, operates its extension or retraction. When the winch 80 unwinds its cable 82, gravity pulls the video imaging system 60 and the extending sections 54 down. To pull the video imaging system 60 back up, the operator rewinds the cable 82. The winch 80 is preferably installed on the telescoping mast 50, but may be fixed to another part of the inspection system 10 that is convenient.

Although other materials may be used for the fabrication of the telescoping mast 50, the use of composite materials is preferred. Two major reasons justify this choice. Firstly, in many instances, inspections are performed in harsh environments with corrosive elements. Secondly, when the articulating radial arm 40 is deployed, the weight of telescoping mast 50 plus video imaging system 60 generates a considerable torque on the first pivot 42. Glass-fiber is a lightweight composite material meeting all design criteria while still keeping the cost reasonable.

A video imaging system 60 is installed at the lower extremity of the extending section 54 of the telescoping mast 50. The video imaging system 60 may be fixed in many ways to the extremity of extending section 54: it may be rigidly fixed, it may be rotatably fixed such as to provide rotation of the video imaging system 60 around the extending axis 56, or it may use an articulation 112 such as to provide any angular movement of the video imaging system 60 with respect to the extending axis 56. Installed in this manner, the video imaging system 60 is the lowest point of the inspection system 10 and can best reach the inside of underground conduits. The video imaging system 60 uses a camera 62 equipped with a relatively high magnification ratio to be capable to perform inspections both from close up and from a distance. Preferably, the camera uses a 26× optical zoom combined with a 12× numerical zoom. Furthermore, although the camera 62 is of a model tolerant to low-light conditions, the video imaging system 60 is equipped with an array of light projectors 64 to provide necessary lighting. The camera 62 and light projectors 64 are mounted in a lightweight housing having fins to dissipate heat generated by the light projectors 64. Preferably, the camera 62 is mounted near the center of the housing 66 with the array of light projectors 64 surrounding it. This design provides the advantage of minimizing shadows captured by camera 62. A further advantage is that this design is very compact. The housing 66 of the video imaging system 60 should be lightweight, resistant to corrosion and watertight. Aluminum is preferably used.

Images obtained by the camera 62 are relayed through wiring, or wirelessly, to the video equipment inside the vehicle for analysis. Alternatively, they could be recorded on a medium (CD, DVD, hard disk, etc) or sent remotely for analysis. Images obtained may be analyzed to determine whether problems such as cracks, blockage, and root infiltration exist. If no problem is detected, then the inspection system 10 may be moved quickly to another area to perform another inspection. On the other hand, if a problem is detected, a pipe crawler or other invasive type of inspection may be performed to obtain the details necessary to remedy the situation. This way, the time of setting up and operating a pipe crawler or similar device is not wasted on areas that are in acceptable condition.

A display 100 is mounted on the outer section 52 of the telescoping mast 50 to allow the operator to visualize where the video imaging system 60 is located. Images from the camera 62 are relayed to the display 100. The display 100 may alternatively be mounted on another part of the inspection system 10. For convenience, the display 100 is preferably mounted at eye level either on the telescoping mast 50 or on a section of the inspection system 10 close to it.

The inspection system 10 is installed on a vehicle 20 having a hitch 24. The adaptor section 32 of support structure 30 is inserted in the receiver 22 of the hitch 24. A locking pin 26 is used to hold the inspection system 10 solidly connected to the hitch 24. Preferably, a standard commercially available hitch having a square cross section receiver is used. However, different models may be used, including non-standard ones, provided that the adaptor section 32 matches the receiver 22. The fact that the inspection system 10 may be adapted to fit a hitch 24 having a standard receiver provides many benefits. For example, the inspection system 10 may be easily installed on, or removed from, in a matter of minutes, various vehicles equipped with a standard hitch having the right receiver. This yields large cost savings, as the owner, often a municipality, does not have to invest in a fleet of special vehicles equipped with a dedicated inspection system 10. Furthermore, when the vehicle is not available (due to maintenance, repair or just plain too old to circulate), the inspection system 10 may be transferred to another vehicle equipped with a similar hitch, hence not jeopardizing the inspections to be conducted. Another advantage is that the considerable weight of a vehicle provides a stable platform for the inspection system 10. Images coming from the video imaging system 60 are therefore of higher quality, in particular when the camera 62 zooms in. This is especially true when the present invention is compared with the hand-held inspection systems of prior art. The installation of the inspection system in the receiver of the hitch is performed in the conventional manner, such that it is not necessary to be described here.

The articulating radial arm 40 and first pivot 42 allow the lateral displacement of telescoping mast 50 and video imaging system 60. Indeed, the operator no longer has to move his vehicle as close to the area to be inspected 90. This feature is extremely useful when the area to be inspected 90 is, for instance, displaced away from the road. The operator may just park his vehicle 20 by the side of the road and extend the articulating radial arm 40 until the telescoping mast 50 is located above the manhole 94. Furthermore, the more arm sections the articulating radial arm 40 has, the more easily the telescoping mast 50 may be deployed around obstacles and the farther from the vehicle 20 it can reach. On the other hand, more pivots add weight, play in the articulating radial arm 40, and cost to the inspection system 10. Hence, the number of arm sections of the articulating radial arm 40 is dictated by these practical considerations. It has been found that an articulating radial arm 40 split in two or three arm sections provides an optimum solution in most cases. In the specific example of FIG. 4, the second rotation axis 44a and third rotation axis 46a of second pivot 44 and third pivot 46 respectively are parallel and oriented vertically. These pivots do not necessarily have to be oriented parallel to each other or vertically. Each of them could well be oriented in any other way. However, it is considered to be preferable to orient them as described. The first arm section 45a of the articulating radial arm 40 is connected at one end to the support structure 30 through first pivot 42 and at the other end to the second arm section 45b of articulating radial arm 40 through second pivot 44. The third arm section 45c of articulating radial arm 40 is connected at one end to the other end of the second arm section 45b through third pivot 46 and at its other end to the telescoping mast 50 through both forth pivot 48 and mast pivot 58. In this specific example, forth pivot 48 is used to provide added maneuverability of the telescoping mast 50 by allowing both the telescoping mast 50 and its mast pivot 58 to rotate around the forth rotation axis 48a. The rotation axis of pivot 48 is preferably oriented coaxially with the third arm section 45c of the articulating radial arm 40 and perpendicularly to the mast pivot 58. The mast rotation axis 58a of mast pivot 58 is preferably oriented horizontally. Although the operator appreciates the added flexibility provided by the use of forth pivot 48, the use of this element is not necessary to perform the invention, as it is possible to do without forth pivot 48.

To simplify the manufacturing process, it is preferable to use the same pivot construction everywhere. Pivots, such as first pivot 42, may use different types of elements to provide rotation: ball bearings, taper bearings and bushings, to name a few. Since the construction of pivots is well know in the art, it will not be covered in further detail here. One or many locking mechanisms 70 may be use to prevent the pivots from rotating. Preferably, a locking mechanism 70 is used at each pivot location to prevent it from rotating both when the inspection system 10 is stored or when the video imaging system 60 is in use. In the latter case, it is important to provide a stable platform for the video imaging system 60, especially when the camera 62 zooms in with its powerful zoom. Each locking mechanism 70 is provided with a handle 72 such that they are easily operated by the operator.

The articulating radial arm 40 may fold on itself, allowing for a very compact storage position. In the present configuration, all arm sections 45a, 45b, 45c of the articulating radial arm 40 fold on the same vertical plane, one section above each other. Once deployed, the articulating radial arm 40 becomes approximately as long as the sum its three arm sections 45,a, 45,b, 45c, providing added range to reach the area to be inspected 90.

Figure 5:
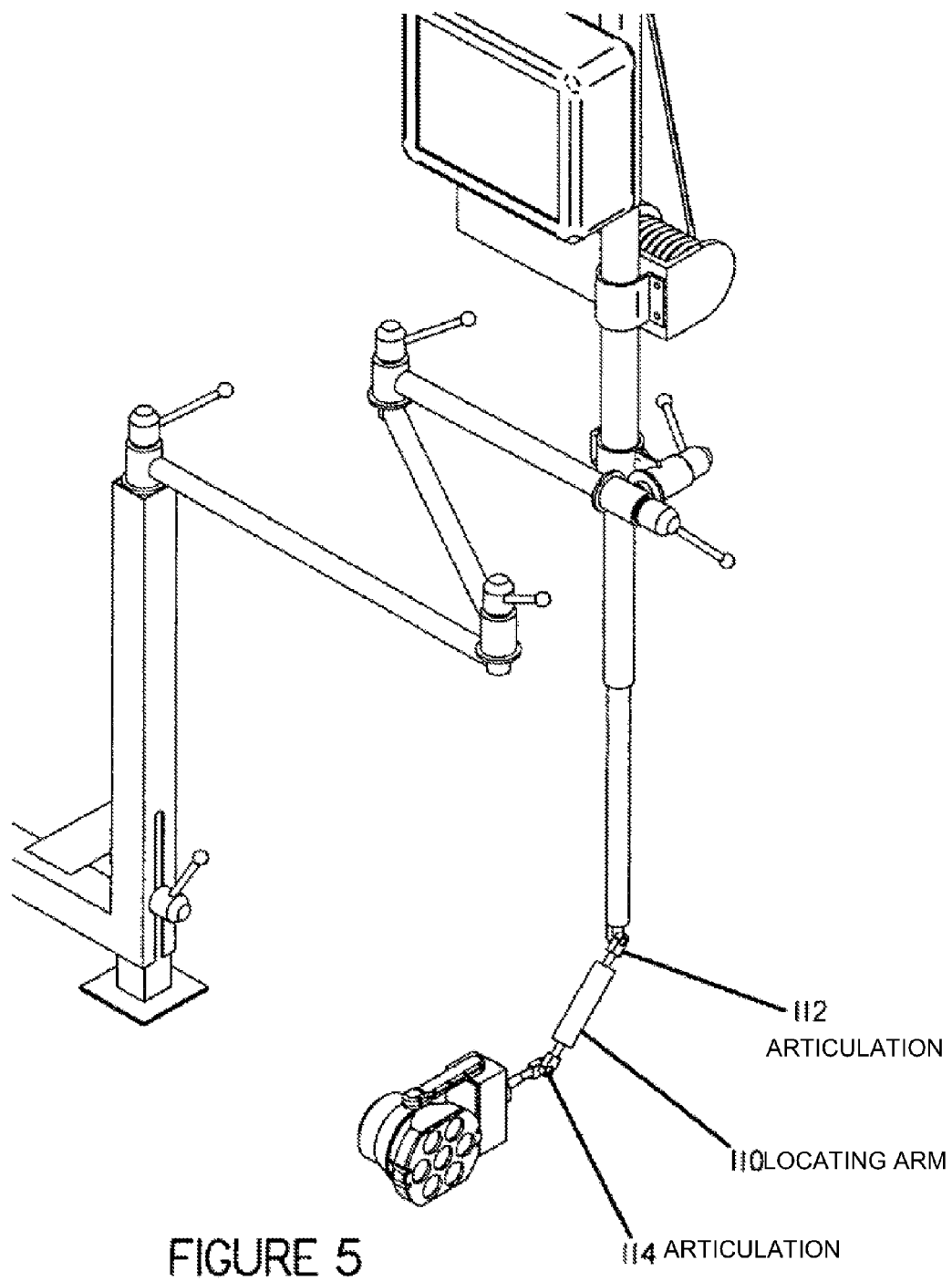
FIG. 5 shows a perspective view of another embodiment of the present invention in action.
Figure 6:
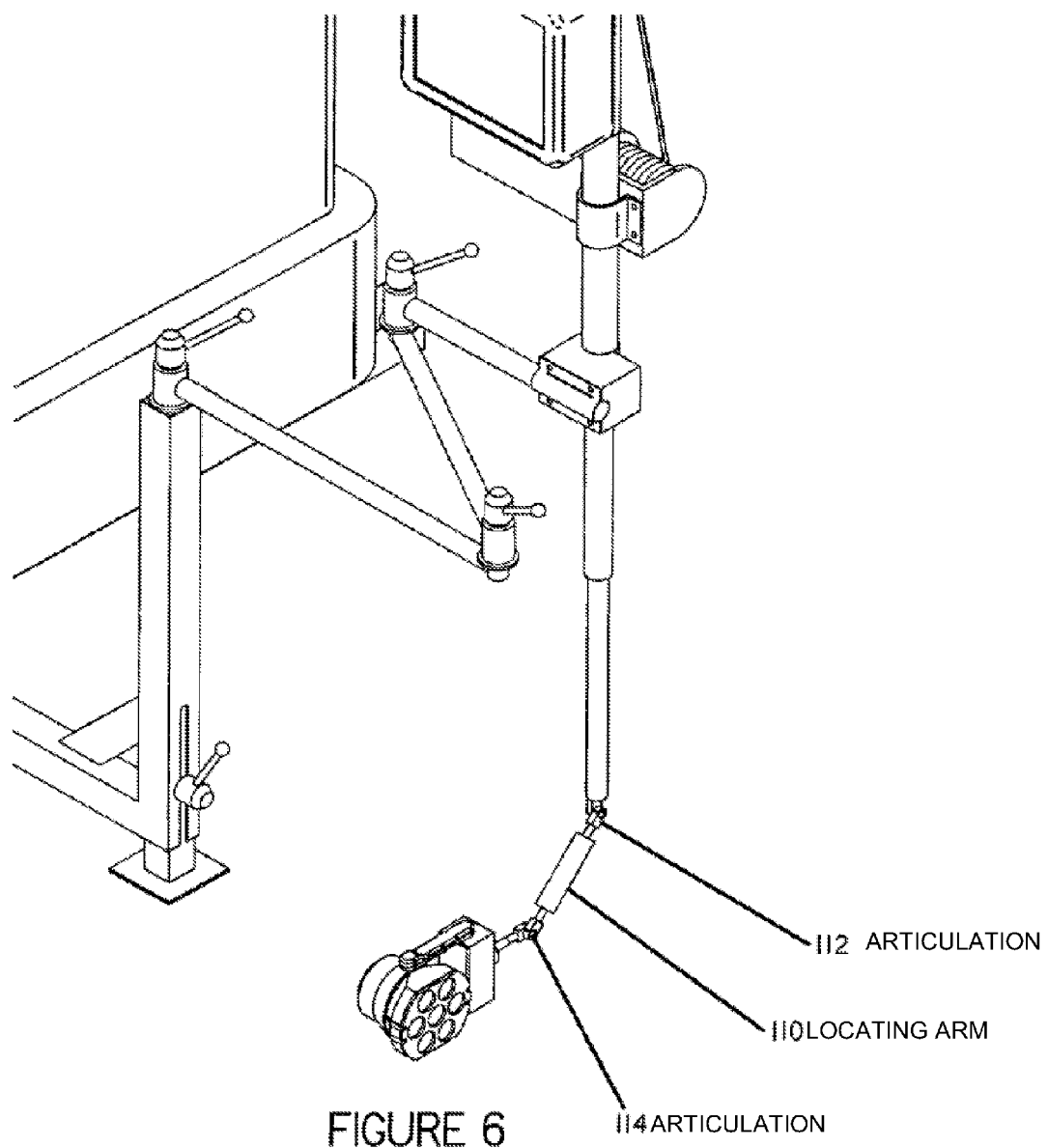
FIG. 6 shows a perspective view of a further embodiment of the present invention.

FIG. 5 depicts an alternative embodiment of the invention that includes a second offsetting mechanism. Similar components are given like reference numbers and their description will not be repeated. The second offsetting mechanism of the inspection system 10 takes the form of a locating arm 110 pivotally connected at the tip of the extending section 54 of the telescoping mast 50. This locating arm 110 is provided with articulations 112 and 114 at each end such that it is possible to laterally offset the video imaging system 60 from the mast reference axis 51 such that the video imaging system 60 is located at the desired location for viewing the interior of the offset lateral conduit 98. Both offsetting mechanisms, namely, the mast pivot 58 and the locating arm 110 may be jointly present on the inspection system. This embodiment provides the maximum flexibility in being able to reach offset lateral conduits. Alternatively, for cost considerations for example, only one of the two offsetting mechanisms may be present on the inspection system 10. FIG. 6 depicts an embodiment where only the locating arm 110 is present. Different offsetting mechanisms could also be used as an alternative to the locating arm 110. For instance, the video imaging system 60 could be mounted on a mechanism that slides perpendicularly to the mast extension axis 56, or a scissor type of mechanism could also be used to laterally project the video imaging system 60 in an offset lateral conduit 98. Many different dispositions and mechanisms to project the video imaging system 60 laterally from the extending mast 50 would be apparent to one skilled in the art, and are all intended to be covered by the present invention.

Figure 7:
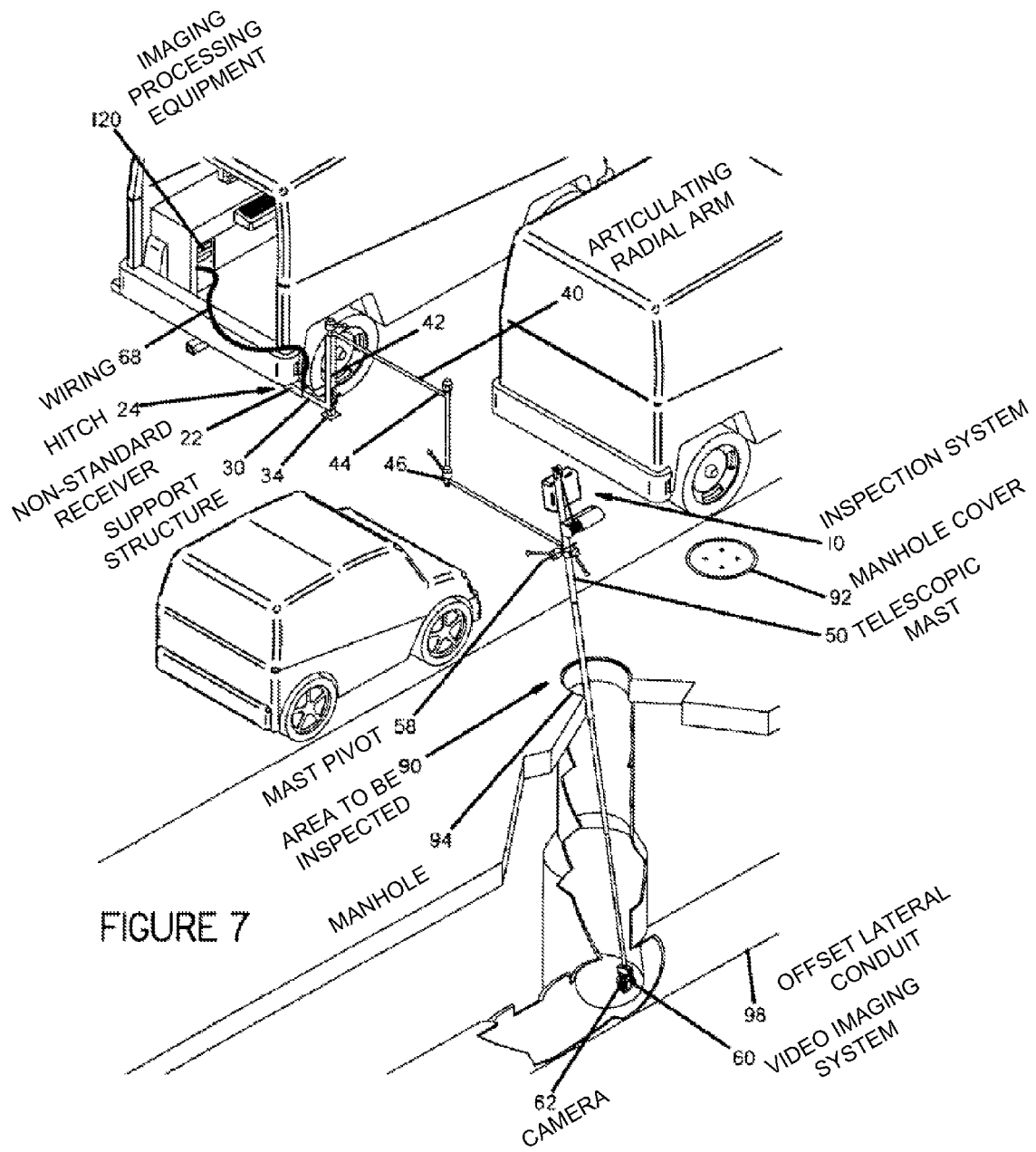
FIG. 7 shows a partial cross-section perspective view of an embodiment of the invention in use.

FIG. 7 highlights the advantages of the invention in use. To work the invention, the operator drives to the area to be inspected 90 and parks his vehicle 20 nearby. If the inspection system 10 is not readily installed, the operator would install it in one of the receivers 22 of the hitches 24 on the vehicle 20. The operator then connects a power supply to the video imaging system 60, to the winch 80 and connects the wiring 68 between the camera 62 and the imaging processing equipment 120. The manhole cover 92 is removed to gain access to the manhole 94. He then lowers the video imaging system 60 in the manhole 94 using the winch 80. Monitoring the images sent back from the camera 62 to the display 100, the operator uses the winch 80, and all adjustments provided by the different pivots 42, 44, 46, 48 and 58 to adequately position the camera 62 at the center of the offset lateral conduit 98 to be inspected. Alternatively, the operator could adjust articulations 112 and 114 to adequately position locating arm 110 and video imaging system 60. If the lateral conduit 98 were not offset from the manhole 94, the operator may not have to use mast pivot 58. The camera 62 is then zoomed to obtain an image at the desired magnification. Once the inspection is finished, the video imaging system 60 is pulled back up, the articulating radial arm 40 is folded back into storage position and the manhole cover 92 put back in place. The operator may then drive to the next inspection area.

Optionally, for further convenience to the operator, or when it is better indicated for him to stay inside his vehicle, because of safety concerns for example, the inspection system 10 is remotely controllable. All moveable parts and joints of the system are motorized such that the operator may remotely manipulate the inspection system 10 from within his vehicle 20. The imaging system 60 continuously sends an image to the operator such that he sees where the camera 62 is going. To get a better view of the environment and where the telescoping mast 50 or the articulating radial arm 40 are continuously located, additional cameras may be added at various locations on the inspection system 10.

Figure 8:
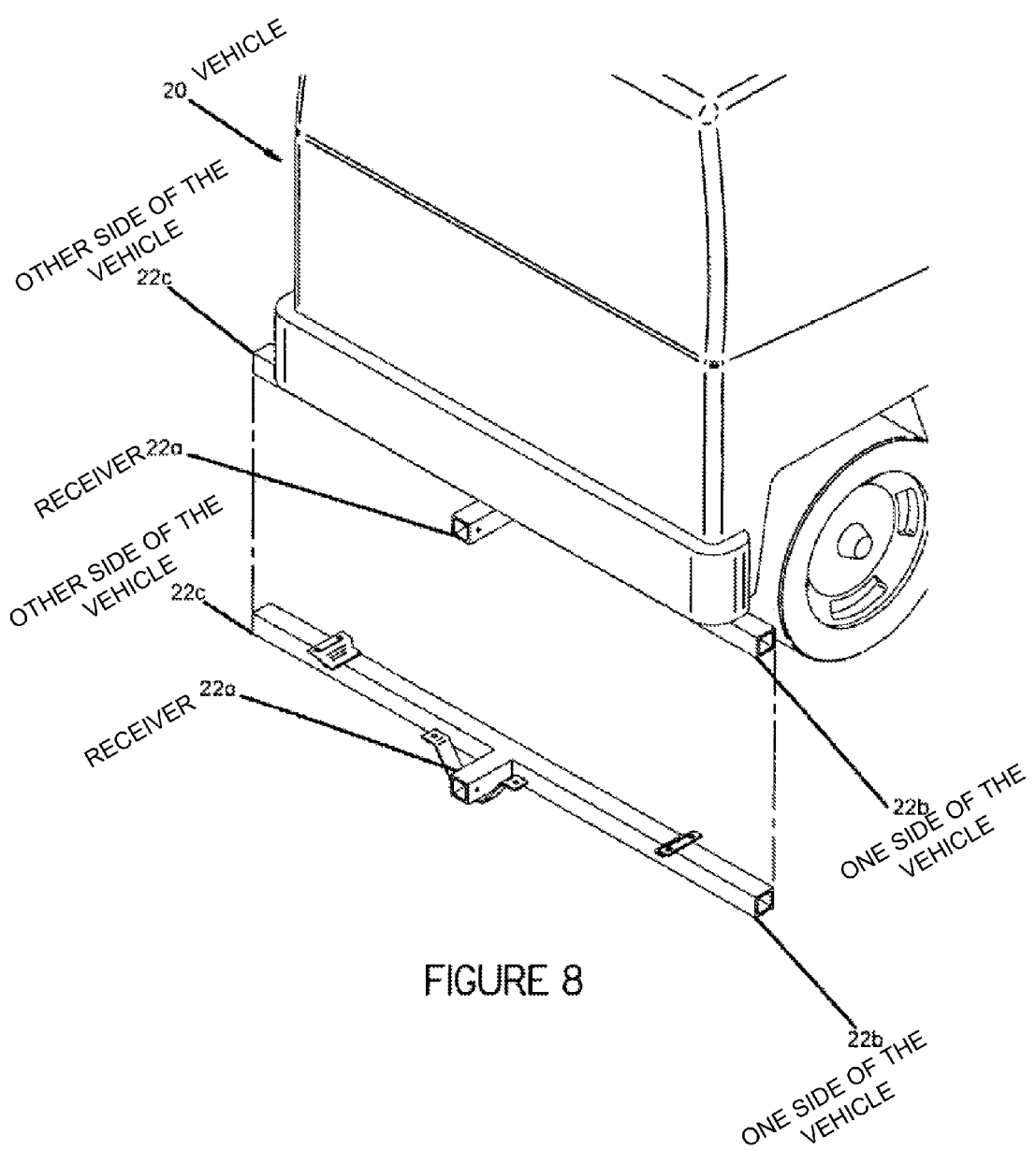
FIG. 8 shows an exploded perspective view of a vehicle having a hitch as per another embodiment of the invention.

To further improve the reach of the inspection system, it is possible to use a specially designed hitch 24 as shown in FIG. 8. Such a hitch has one receiver 22a facing towards the back and one facing towards each side of the vehicle, 22b and 22c, for a total of three receivers. This design is convenient as it allows the operator to install the inspection system 10 either at the back or at the left or the right of the vehicle 20. This proves to be useful when all manholes to be inspected are located on the same side of the street, or if the operator needs to reach farther away on one side of the vehicle. The hitch 24 shown in FIG. 8 shows a receiver normally located towards the back of a vehicle and a square tube placed perpendicularly to the back receiver 22a, defining both lateral receivers 22b and 22c at each of its extremities. The inspection system 10 is connected in the same manner whether it is at the back or on the sides of the vehicle 20. Alternatively, the hitch may have more or less than three receivers and they may be placed at any position, any angle and any height with respect to one another.

The person skilled in the art will recognize that many variations could be made to the present invention. For instance, the inspection system 10 could be equipped with a non-standard adaptor section 32 and fit into a corresponding non-standard receiver 22. Furthermore, the inspection system 10 does not have to be installed on a hitch: indeed, it could be connected to a vehicle 20 either permanently, or through the use of fasteners. Also, the inspection system could be permanently installed on the back, or at the side, of a vehicle. The vehicle used with the invention is a land vehicle such as, without limitation, a car, a truck, a sport utility vehicle, an all-terrain vehicle, a trailer, or even a set of wheels, mounted or not on their own frame, fixed to the support structure 30.

The present invention has been described with regards to preferred embodiments. In will be obvious to one skilled in the art that several modifications or variations may be brought to the invention without departing from the scope of the invention as described herein and are intended to be covered by the present description.

I claim:

1. An apparatus for conducting remote subsurface inspections from above, comprising:
    a support structure adapted to be positioned above a working surface, said support structure having an articulating radial arm, said articulating radial arm having a pivot at one end and a coupling at the other end, said pivot having a rotation axis substantially normal to said working surface;
    a mast held by said coupling and born generally upright in use by said support structure, said mast having an extending portion that is downwardly extendable below the working surface and that has a mounting thereon;
    an imaging system held by said mounting on said extending portion of said mast; and
    an offsetting mechanism operative to displace said imaging system laterally from a vertical reference axis beneath said coupling when said extending portion of said mast has been extended below the working surface.

2. The apparatus as defined in claim 1 wherein said coupling comprises a mast pivot having a mast rotation axis substantially perpendicular to an extension axis of said mast, said mast pivot being maneuverable to allow rotation of said mast with respect to said support structure around said mast rotation axis.

3. The apparatus as defined in claim 2 wherein said articulating radial arm comprises a plurality of sections joined by swivels.

4. The apparatus as defined in claim 3, wherein said swivels and said mast pivot have locking mechanism to prevent their free rotation.

5. The apparatus as defined in claim 4, wherein said support structure further comprises a retractable ground contacting leg to aid in stabilizing said mast when said apparatus is in use.

6. The apparatus as defined in claim 5 further comprising a display to display images from said imaging system.

7. The apparatus as defined in claim 6 wherein said display is mounted on a portion of said mast that is not downwardly extendable below the working surface.

8. The apparatus as defined in claim 7 further comprising an actuating mechanism operative to extend and retract said extending portion of said mast.

9. The apparatus as defined in claim 8 wherein said support structure comprises an adaptor section adapted to fit to a hitch installed on a vehicle.

10. The apparatus as defined in claim 9 wherein said mast comprises telescoping cylindrical sections.

11. The apparatus as defined in claim 10 wherein said imaging system comprises a video camera.

12. The apparatus as defined in claim 11 wherein said imaging system further comprises at least one light.

13. The apparatus as defined in claim 12 wherein said imaging system further comprises a plurality of lights arranged around said video camera.

14. The apparatus as defined in claim 13 wherein said video camera comprises a zoom lens of at least 20 times magnification.

15. The apparatus as defined in claim 1 wherein said mounting comprises an adjustable interconnection between said imaging system and said extending portion of said mast, said interconnection being remotely maneuverable from a first position in which said imaging system is proximal to said extending portion of said mast, to a second position in which said imaging system is displaced from said extending portion of said mast.

16. An apparatus for conducting remote subsurface inspections from above, comprising:
    a support structure having an articulated radial arm and a coupling, said articulating radial arm comprises a plurality of sections joined by swivels, said articulated radial arm being connected to said coupling, said support structure being adapted to be positioned above a working surface;
    a mast held by said coupling and born generally upright in use by said support structure, said mast having an extending portion that is downwardly extendable below the working surface and that has a mounting thereon; and
    an imaging system held by said mounting on said extending portion of said mast.

17. The apparatus as defined in claim 16 further comprising an offsetting mechanism operative to displace said imaging system laterally from a vertical reference axis beneath said coupling when said extending portion of said mast has been extended below the working surface.

18. The apparatus as defined in claim 17 wherein said coupling comprises a mast pivot having a mast rotation axis substantially perpendicular to an extension axis of said mast, said mast pivot being maneuverable to allow rotation of said mast with respect to said support structure around said mast rotation axis.

19. The apparatus as defined in claim 17 wherein said mounting comprises an adjustable interconnection between said imaging system and said extending portion of said mast, said interconnection being remotely maneuverable from a first position in which said imaging system is proximal to said extending portion of said mast, to a second position in which said imaging system is displaced from said extending portion of said mast.

20. The apparatus as defined in claim 19, wherein said support structure further comprises a retractable ground contacting leg to aid in stabilizing said mast when said apparatus is in use.

21. The apparatus as defined in claim 20 wherein said support structure comprises an adaptor section adapted to fit to a hitch installed on a vehicle.

22. The apparatus as defined in claim 21 wherein said mast comprises telescoping cylindrical sections.

23. The apparatus as defined in claim 22 wherein said imaging system comprises a video camera.

\* \* \* \* \*